Aug. 20, 1968     A. C. SULESKI     3,398,076
METHOD FOR THE ELECTROPURIFICATION OF WATER
Filed March 21, 1963
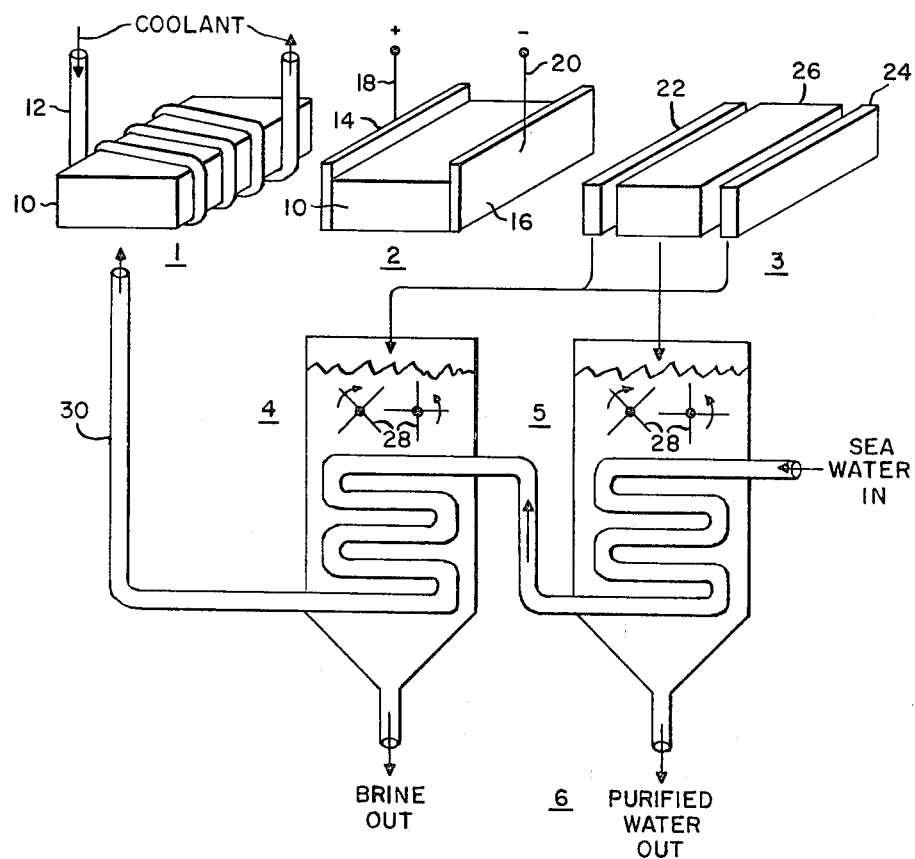

United States Patent Office 3,398,076
Patented Aug. 20, 1968

3,398,076
METHOD FOR THE ELECTROPURIFICATION
OF WATER
Anthony C. Suleski, Centerport, N.Y., assignor to Hazeltine Research Inc., a corporation of Illinois
Filed Mar. 21, 1963, Ser. No. 266,855
2 Claims. (Cl. 204—180)

At the present time much effort is being expanded in attempting to discover economical methods for the conversion of sea water into drinking water and also into somewhat less pure water for purposes such as irrigation. Certain freezing processes have been suggested in which pure ice crystals are sought to be recovered from partially frozen sea water. A shortcoming of such methods arises from the fact that the impurities tend to stick to the outside of the pure ice crystals and can only be removed by grinding away the surfaces of the crystals or by other equally expensive processes.

The objects of this invention, therefore, are to provide new and improved methods for purifying water which are simple and economical and which avoid disadvantages of prior methods.

In accordance with the invention, a method of purifying water comprises freezing a quantity of impure water, applying a D-C (direct-current) potential between separated surface areas of the resulting ice so as to cause impurities to congregate near said surface areas, cutting away portions of the ice adjacent to these surface areas and melting the remaining ice.

For a better understanding of the present invention, together wtih other and further objects thereof, reference is had to the following description taken in connection with the accompanying drawing, and its scope will be pointed out in the appended claims.

In the drawing there are shown in schematic form the steps in a method of purifying water in accordance with the invention.

Referring to the drawing, the more important steps in a method in accordance with the invention are labeled 1, 2 and 3. As illustrated, a method of purifying water comprises the following steps. (1) Freezing a quantity of impure water. This is shown schematically at 1 in the drawing, where a quantity of impure water 10 is frozen into a block of ice, also labeled 10, by the action of a coolant flowing through the pipe 12. (2) Applying a D-C potential to the block of ice 10. As shown at 2 in the drawing, this may be done by placing metal electrodes such as anode 14 and cathode 16 in contact with separated surface areas of the block 10 and applying a D-C potential between electrodes 14 and 16. This potential may be applied via the conductors 18 and 20. (3) Cutting away portions of the ice which were adjacent to the surface areas where the electrodes contacted the ice. As shown at 3, the portions 22 and 24 have been cut away. The remaining portion 26 of the ice is then melted to produce purified water.

The method, as just discussed, utilizes the phenomenon whereby when a block of ice as 10 is subjected to a D-C potential, as at 2 in the drawing, the anionic and cationic impurities congregate near the respective electrodes. The result is to leave a central portion of the block of ice 10 substantially free of impurities. As shown at 3 in the drawing the portions 22 and 24, wherein the impurities have been caused to congregate, can be cut away so as to leave a portion of pure ice 26 which includes substantially no impurities. The portion of ice 26 may then be melted to produce purified water. The D-C potential required will depend on the purity of water required and the distance between the electrodes. In particular applications the actual D-C potential utilized may range from one to several hundred volts. As the impurities congregate near the electrodes the current flowing through the volume of ice undergoing purification will decrease. As the current decreases it is considered preferable to increase the voltage so as to maintain a useful level of power input. As a rough approximation, approximately 6.5 ampere hours of electricity per pound of water are required to derive pure water from normal sea water.

As illustrated in the drawing, a method in accordance with the invention, may include additional steps such as the following. Referring to 4 in the drawing, the portions 22 and 24 of the ice block, which have been cut away and which are the portions including the impurities. may be crushed, (for example by rotating members such as 28) and utilized to cool additional impure water which is to be purified. As shown at 5 in the drawing, the remaining portion of the ice at 26, from which the impurities have been removed, may also be crushed and utilized in cooling impure water which is to be purified. It will be understood that this cooling of additional water which is to be purified should preferably be carried out as indicated so that neither the impure water nor the purified water are permitted to mix with each other or with the additional impure water which is to be cooled. As shown at 6 in the drawing, the pure water is finally recovered after it has melted from the crushed ice form which was used to cool additional impure water. As shown the additional water to be purified after having been preliminarily cooled by crushed portions of ice, is transported through pipe 30 to step 1 and the process is repeated.

Methods for the purification of water in accordance with the invention are especially applicable to the purification of sea water for drinking purposes, as well as for purposes such as irrigation where somewhat less pure water is acceptable. Purification of water in accordance with the invention can be carried out as a continuous operation, for example with a conveyor type mechanical system continuously moving water undergoing purification through the various steps, or as a separate batch operation, for example where a quantity of water is first frozen and then subjected to the other operations in a series of finite steps.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:
1. The method of purifying water comprising:
freezing a quantity of impure water into a block of ice;
applying a D-C potential between two separated surface areas of said block of ice so as to cause impurities to congregate near said surface areas;
cutting away the portions of said ice in which said impurities have congregated;
crushing said portions in which impurities have congregated and using said crushed portions to cool additional water to be purified;
crushing the remaining portion of said ice and using said crushed remaining portions to cool additional water to be purified;
and recovering the purified water produced by the melting of said remaining portion of ice.
2. The method of purifying sea water comprising:
freezing a quantity of sea water into a block of ice;
placing anode and cathode electrodes in contact with separated surface areas of said block of ice;
applying a D-C potential between said electrodes so that anionic and cationic impurities congregate near the respective electrodes;

cutting away portions of said ice in which said impurities have congregated;

crushing said portions in which impurities have congregated and using said crushed portions to cool additional sea water to be purified;

crushing the remaining portion of said ice and using said crushed remaining portion to cool additional sea water to be purified;

and recovering the purified water produced by the melting of said remaining portion of ice.

References Cited
UNITED STATES PATENTS

| | | | |
|---|---|---|---|
| 1,016,097 | 1/1912 | Ruprecht | 204—180 |
| 1,603,298 | 10/1926 | Speed | 204—180 |
| 2,566,308 | 9/1951 | Brewer | 204—180 |
| 2,711,379 | 1/1955 | Rothstein | 204—180 |
| 3,084,113 | 4/1963 | Vallino | 204—180 |

JOHN H. MACK, *Primary Examiner.*

E. ZAGARELLA, *Assistant Examiner.*